United States Patent [19]

Benke

[11] 3,768,505
[45] Oct. 30, 1973

[54] DRAIN CHECK VALVE AND MOUNTING MEANS
[75] Inventor: Balazs Kiss Benke, Parma, Ohio
[73] Assignee: BKB Company, Parma, Ohio
[22] Filed: Apr. 28, 1971
[21] Appl. No.: 138,098

Related U.S. Application Data
[63] Continuation-in-part of Ser. No. 2,734, Jan. 20, 1970, abandoned.

[52] U.S. Cl. ................................................ 137/433
[51] Int. Cl. ......................... E03g 1/00, F16k 31/18
[58] Field of Search ................. 137/202, 433, 454.2; 285/139, 338, 346; 220/24.5

[56] References Cited
UNITED STATES PATENTS
1,753,724   4/1930   Shaw ................................. 137/433
2,843,146   7/1958   Kirschner .......................... 137/433
  653,255   7/1900   Toetzer ............................. 137/202
3,173,442   3/1965   McKellip ..................... 137/454.2 X
1,423,679   7/1922   Pavitchick ........................ 137/433

Primary Examiner—Alan Cohan
Attorney—Woodling, Krost, Granger and Rust

[57] ABSTRACT

A drain check valve using a peripheral mounting gasket compressionally loaded to bind itself against the interior of a pipe, with the maximum amount of compressive loading being fixed by a mechanical stop. A valve is guided in the unit by a guide post engaging the float internally away from liquid flow. A vent is available to communicated gases to atmosphere.

7 Claims, 7 Drawing Figures

INVENTOR.
BALAZS KISS BENKE
BY
Woodling Krost Granger+Rust
Attys.

DRAIN CHECK VALVE AND MOUNTING MEANS

This application is a continuation-in-part application of U. S. Ser. No. 2,734 filed Jan. 20, 1970 now abandoned.

The present invention relates to check valves for normally open drains and is more particularly concerned with backup locks for sewer drains and means for mounting such valves for their simple installation and removal.

A variety of valve designs are available as sewer backup locks and typically include a float or float mechanism to close the drain during flood conditions or upon stoppage and backup in the system. Certain of the prior designs include mounting means which make it possible to install the assembled valve in ordinary pipe without dis-assembly or the provision of specific apparatus to accommodate the valve.

However, the quick-assembly valves heretofore available have not been entirely satisfactory. For example, problems remain such as failure of the mounting means under extreme pressure loads or because of weakening of parts of the assembly mechanism by over-stressing of either the pipe or the mechanism during installation.

In contrast, the present invention provides a valve having a peripheral member which is distendable radially against the inner wall of the pipe (or other structure) in which it is to be mounted. Means are included to fix the radial pressure against the pipe within predetermined limits to provide an adequate minimum assembly pressure while limiting the pressure in accordance with the structural limits of the pipe and the assembly.

The present invention provides a valve construction where solids and liquids encountered in the system do not normally engage the areas of contact between the guide and valve member and therefore do not hinder movement between the two. In this installation the construction is such that backed up solids and liquids do not engage and contact the valve seat but are spaced therefrom because of a trapped air column. The valve construction is of such a design that the normal liquid flow down the drain will keep the valve member free of lint and other solids accumulation.

The preferred form of the invention is shown in the drawings, in which.

Figure 1:
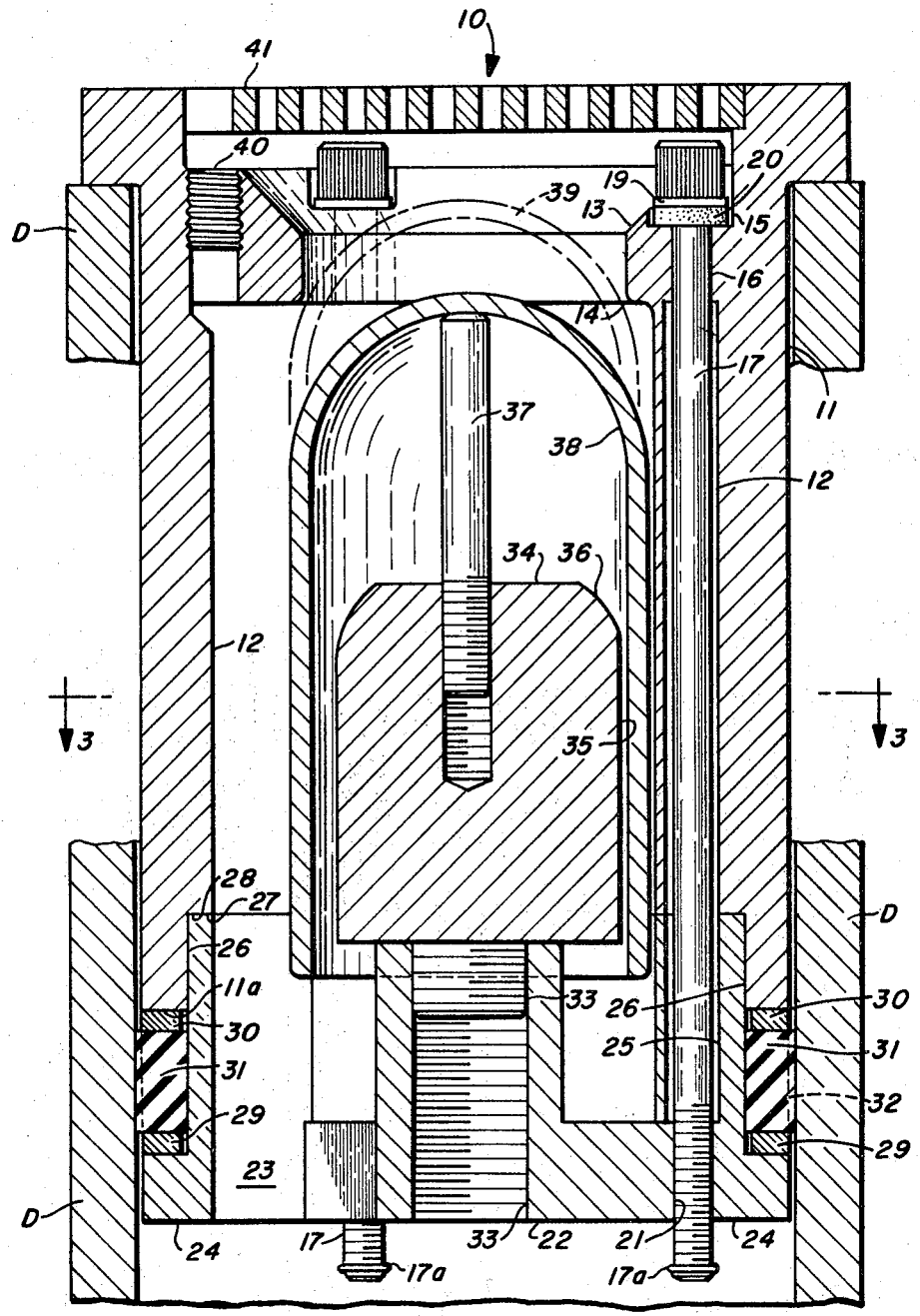
FIG. 1 is an elevational view in section of the valve installed in a pipe.

As shown in the drawings, the valve 10 is mounted in a drain pipe D and includes a body 11 having an axial main bore 12. Near the upper end of the bore, a ledge or wall 13 projects inwardly and terminates in a valve seat or circular aperture 14. The ledge 13 has a plurality of recesses 15 and aligned bores 16 to receive assembly bolts 17.

Figure 2:
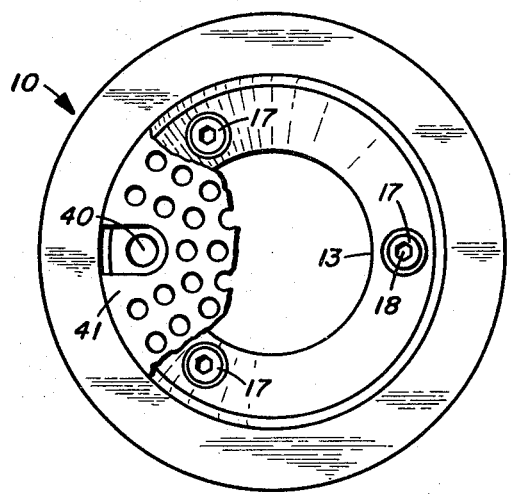
FIG. 2 is a plan view, partly cut away, on a smaller scale.

The heads of bolts 17 may have any suitable wrenching form such as screwdriver slots or the wrench sockets 18 best seen in FIG. 2. The bolts 17 engage the ledge 13 by means of steel washers 19 and cushioning washers 20 and extend through the bores 16 and the main bore 12 to engage threaded apertures 21 in a compression or base plate 22. The bolts 17 carry stops 17a, such as circlips, to prevent their inadvertant removal from the apertures 21.

The base plate 22 has a plurality of drain apertures 23 therein and carries a flange 24 of a diameter similar to the diameter of the valve body 11. The base plate 22 also carries an upwardly projecting sleeve 25 which is received in a relief bore 26 in the valve body 11. The sleeve 25 terminates at its upper end in a shoulder 27 which meets an abutment or radial face 28 at the junction of the bores 26 and 12.

Surrounding the sleeve 25, the base plate carries a pair of rigid ring washers 29 and 30 which are separated by a deformable gasket 31 of rubber or similar deformable material. The washer 29 bears against base plate flange 24 and the upper washer 30 bears against the lower edge 11a of the valve body 11. When not under compression, the outer surface of gasket 31 may lie in the position exemplified by the dotted line 32, as will be discussed more fully hereinafter.

Figure 3:
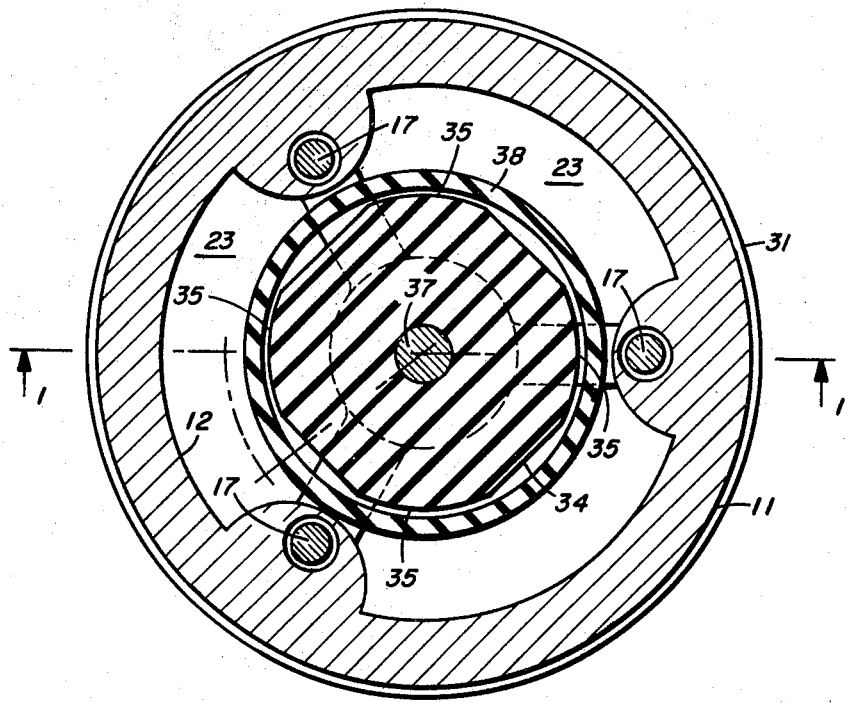
FIG. 3 is a cross-sectional view taken on line 3—3 of FIG. 1.

The base plate 22 has a central threaded bore 33 for mounting a guide post 34 centrally within the bore 11. The post 34 is generally square in cross-section, as best seen in FIG. 3, but is relieved or rounded at its edges 35 and at its upper corners 36.

The post 34 carries a hanger pin 37 at its upper end on which a valve member 38 normally rests. The valve member 38 preferably takes the general form of an elongated, hollow, or bell-shaped, rubber or synthetic member fitting relatively loosely over the post edges 35. Externally, the valve member 38 is of greater diameter than the circular aperture 14 of ledge 13, so that the rounded portion of the valve member can fully close that aperture, as shown in dotted lines at 39.

It is of particular importance that the guide post 34 is located within the valve member 38 and out of the path of drainage through the valve. This prevents any debris, such as lint, strings, or trash, from being trapped between the valve member and its guide. Any such trapped matter would interfere with the reliable operation of the valve member 38, as occurs in prior devices which employ external guides.

Another particularly advantageous feature of the invention is a threaded bore or vent 40 through the ledge 13 which provides for relief of gas trapped in the bore 12. With suitable riser and overflow piping (not shown) extended through the conventional screen cover 41 the vent can be piped to any suitable place, for example exteriorly of a building within which this structure is located.

In operation, the bolts 17 are loosened so that the base plate hangs relatively loosely and the outer surface of the gasket 31 is in the retracted position represented by the dotted line 32. In this condition, the valve assembly 10 is inserted in the pipe D to the position desired, and tightening of the bolts 17 is started.

As a result of tightening the bolts 17, the base plate 22 is positively drawn toward the ledge 13 so that the compression washers 29 and 30 are forced toward each other by the flange 24 and the lower edge 11a of the body 11. This motion of the washers 29 and 30 squeeze the gasket 31 radially outwardly against the wall of pipe D and radially inwardly against the surface of sleeve 25 to form a frictional lock therebetween.

However, the amount of radial stress placed on the pipe D and the sleeve 25, as well as the possibly destructive, compressive-load on the material of the gasket 31, is positively limited by engagement of the shoulder 27 against the radial face 28, which prevents further tightening of the bolts 17. Where desired, the maximum compressive-load on the gasket 31 may be changed by a change in thickness of the washers 29, 30.

This positive, dual limitation of the assembling force is of particular advantage in this invention, especially since the people who maintain or work with such valves often are not mechanics of the highest calibre, including both inept homeowners and low-wage laborers. The mounting means of the present invention provides a high degree of reliability in that one simply tightens the bolts 17 until they refuse to turn any further against the abutment of shoulder 27 and face 28. This assures both an adequate mounting force and a limitation of the force to prevent damage to either the pipe or the valve. Since proper maintenance of such valves requires periodic removal for cleaning, this advantage is repetitive.

Once installed, the valve reacts to a backup of liquid by lifting of the valve member 38 against the aperture or valve seat 14. Air trapped under the bell-shaped float provides for positive lifting and closing of the valve member 38 until the water recedes.

Where the vent bore 40 is not used, it is to be plugged in any suitable manner. However, it is preferred to provide a vent line from the bore 40 to a suitable elevation for spilling liquid or venting of gas. For example, in a basement drain, the vent bore 40 may be piped outside to an elevation just above the ground.

FIGS. 4 through 7 illustrate a modified form of the structure which has been shown in FIGS. 1 through 3 and illustrates a variation in the present teachings. Shown in the drawings is a drain check valve identified generally by the reference numeral 45 in combination with a drain which includes a sewer drain pipe 47 which has an upper open bell 48 connected to a lower smaller diameter conduit by means of a shoulder 50 which as seen, defines a generally horizontal surface. A fitting ring 52 is positioned within the bell 48 and has its lower end portion resting on the shoulder 50 and has its opposite upper end portion terminating approximately level with the upper open end of the bell 48. The fitting ring 52 has an outer surface which is provided with a recessed wall portion 53 and the fitting ring defines what is generally referred to as an annular chamber 55 with the bell 48. The fitting ring also has an inner surface which is provided with a wall thereon which defines a shoulder 54. The basic reason for providing the fitting ring 52 is so that a consistent diameter can be provided for securing the check valve in the sewer drain. It will be appreciated by those skilled in the art that the inner circumferentially extending surface of the bell 48, as drain pipe are commercially constructed, is not held to a very close tolerance and so therefore in any given installation the tolerance might be such that the means for securing the check valve in the drain would be ineffective.

Figure 5:
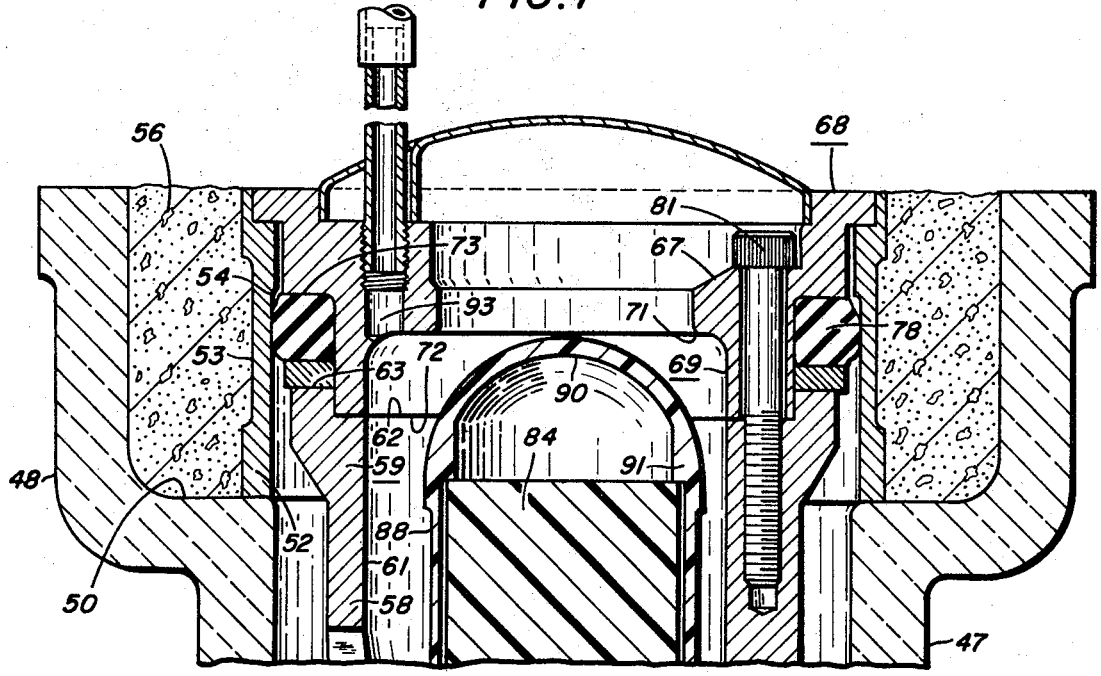
FIG. 5 is a fragmentary elevational view similar to FIG. 4 showing the valve after being firmly secured in the drain pipe.
Figure 6:
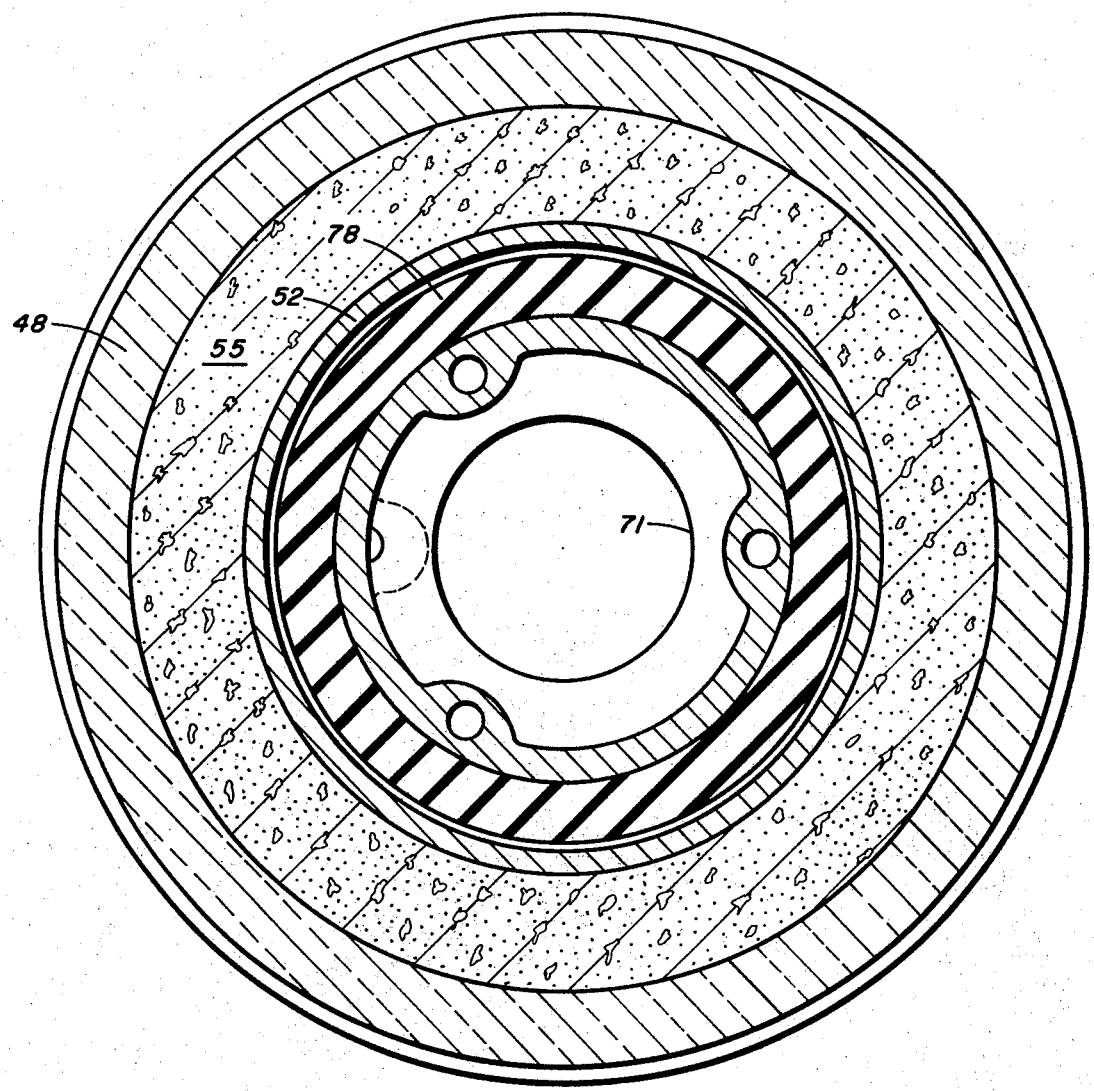
FIG. 6 is a view taken generally along the line 6—6 of FIG. 4.

The fitting ring 52 is secured in the bell 48 by means of cement 56 which is provided in the annular chamber 55 and as will be seen particularly in FIG. 5, this cement travels into the recessed wall portion 53 so as to firmly anchor the fitting ring in the position shown. It is preferred that the cement be a special type of latex cement since this type of cement is able to flex with temperature variations to a much higher degree than ordinary cement. This ability of the material helps to keep at a minimum, the internal stresses that eventually produce cracks and weakening of the structure.

The check valve comprises a lower body member 58 having upper and lower end portions 59 and 60 respectively and having a bore 61 extending therethrough. The upper end portion of the lower body member is provided with a stop surface 62 and what has been referred to as a force applying surface 63. The lower end portion 60 of body member 58 is formed in the nature of a tripod construction having leg members 64 and fluid finds access to the drain by way of the openings which occur between the leg members 64.

An upper body member 67 is provided which has upper and lower end portions 68 and 69 respectively and a bore 70 which extends therethrough and generally coaxial with the bore in the lower body member 58. Wall means are provided in the bore 70 of the upper body member and serve to define a valve seat 71. The upper body member 67 like the lower body member 58 is also provided with a stop surface 72 and a force applying surface 73 and these two surfaces are located axially in line with surfaces 62 and 63 respectively on the lower body member.

As seen in the drawings a deformable ring or gasket 78 is provided and surrounds the lower end portion 69 of body member 67 and is located between the force applying surfaces 63 and 73. A metal washer or ring 75 is provided adjacent the deformable ring 78, however, the only purpose this ring accomplishes is providing the proper axial distance between surfaces 63 and 73. It will be appreciated by those skilled in the art that the deformable ring can be either cut from an extruded member or can in effect be "die cast." In this particular construction the ring is cut from an extruded axial member and the tolerances can only be held within certain limits. In order to achieve exactly the correct axial dimension the metal washer 75 is provided of the correct thickness so that the precise dimension is provided. In all other respects the metal washer 75 is unnecessary. Three axially extending bolts 81 are provided which extend through openings in the upper body member 67 and into threaded openings in the lower body member 58. These bolts when tightened in a conventional manner serve to move the upper and lower body members axially toward each other to a position which is limited by engagement of the surfaces 62 and 72. Assembly of the upper and lower body members together in such a manner as to lock the entire assembly in the drain pipe will be discussed in more detail hereinafter.

The lower end portion 60 of the lower body member is provided with a base 65 from which extends a generally axially extending mount 66. A valve guide 84 which extends in generally an axial direction is secured to the lower end portion of the lower body member by means of a threaded extension 85 being threadably received in the mount 66. As will be seen in FIG. 7 the valve guide 84 is generally square in cross section with the corners being rounded off or radiused as at 86 so that bearing surfaces are provided. It will be appreciated that the number of bearing surfaces is not critical and the number of surfaces might be more or might be only three in number. A valve member 88 is adapted to move axially on the valve guide 84 between an upper closed position shown in dotted lines in FIG. 4 wherein it is in engagement with the valve seat 71 so as to close the bore in the upper and lower body members and a lower open position whereat liquids can readily flow through the valve. The valve member 88 is comprised of a generally cylindrically shaped member having an open lower end 89 and a closed upper end 90. The closed upper end as shown carries generally the shape of a hemisphere which shape is the portion of the valve member which engages the valve seat in the closed position of the valve member. In a manner similar to FIG. 1 a vent 93 is provided which may be piped or otherwise connected to the outside of any structure within which the valve is installed and is for the purpose of relieving the drain pipe and system closed off by closing of the valve with any sewer gases or other detrimental materials.

Figure 4:
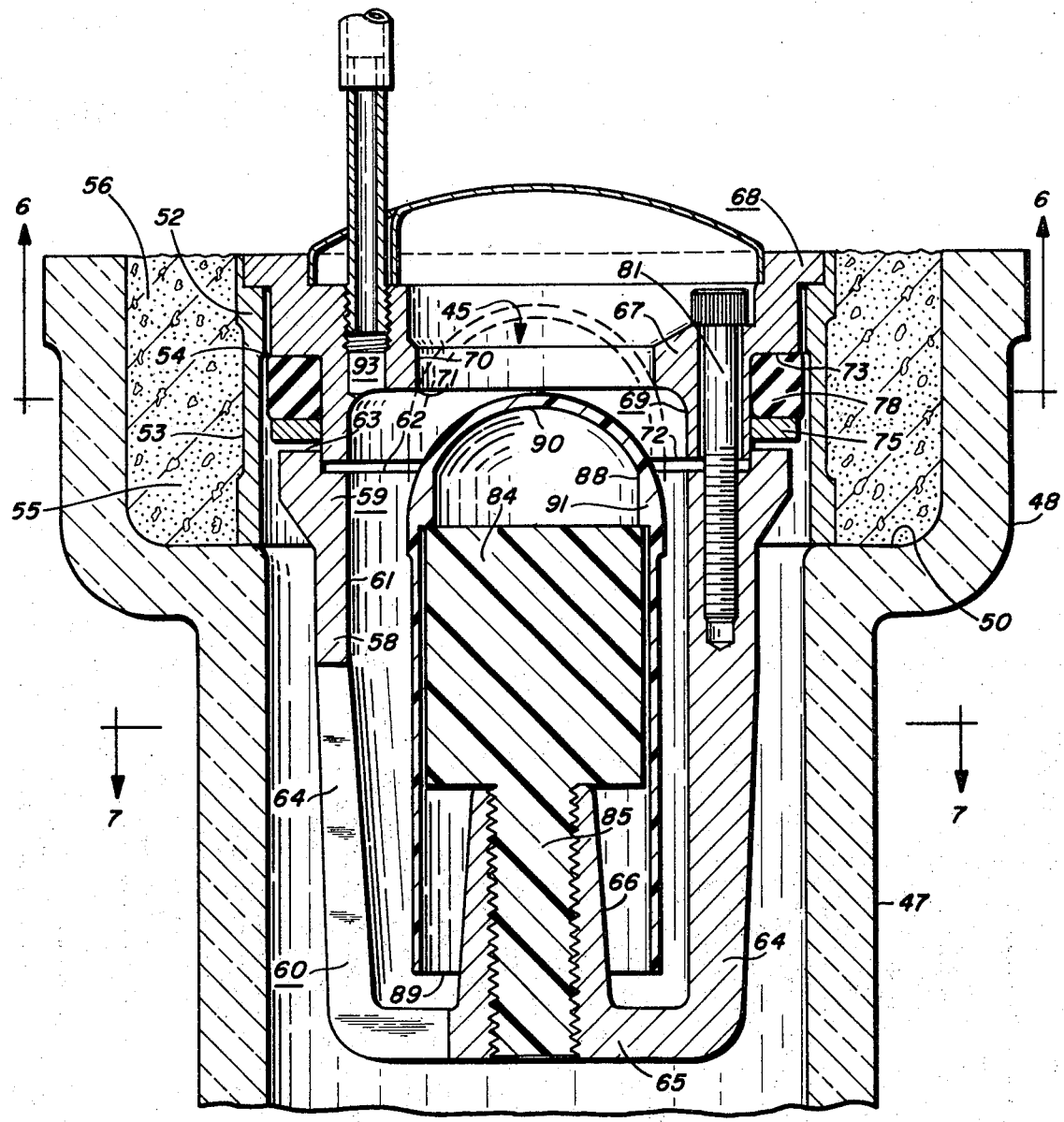
FIG. 4 is an elevational view in section of a modification of the valve of the present invention positioned in a drain pipe.
Figure 7:
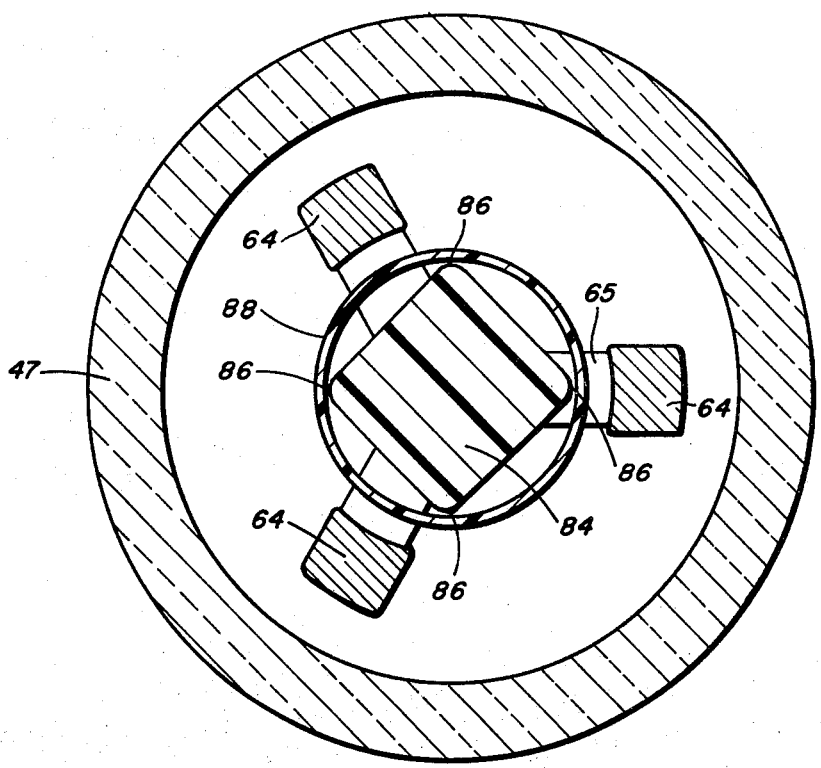
FIG. 7 is a view taken generally along the line 7—7 of FIG. 4.

The check valve shown in FIGS. 4 through 7 is assembled by placing the parts in the position generally shown in FIG. 4 and in this position it will be noted the exterior circumferential surface of the deformable rubber ring 78 is spaced from the internal surface of the fitting ring 52 and it will also be noted that the stop surfaces 62 and 72 are spaced from each other. The bolts 81 are then tightened which causes the force applying surfaces 63 and 73 to squeeze or compress the deformable rubber ring 78 causing it to expand radially into contact with the inner surface of the fitting ring and to engage this surface below the shoulder 54. This is shown in FIG. 5. The amount of compression of the ring and the amount of its radial expansion is limited by engagement of the stop surfaces 62 and 72. This assures that the same consistent holding effect can be accomplished each time that the check valve is placed in the drain.

With the check valve held in the drain pipe as shown in FIG. 5 and with the valve member in open position it will be apparent that drain water such as drainage from washing machines, etc., can freely flow through the openings in both the upper and lower body members and can find access to the city sewer system in a conventional manner. The action of the liquids over the hemispherically shaped closed upper end 90 acts to conveniently cleanse this particular surface which is a surface which must seat against the valve seat 71 in the closed condition of the check valve.

Now let it be assumed that the sewer system becomes incapable of handling a given flow of liquid and the liquid backs up in the drain pipe 47 and toward the basement floor of a residence. The action of the liquid backing up the drain pipe causes air trapped within the confines of the valve member 88 to be compressed, thereby lifting the valve member 88 into the closed position which is indicated by the dotted lines in FIG. 4. The valve member is held in this closed condition essentially by means of a trapped column of air between the upper surface of the liquid and the inside surface of the closed upper end 90 of the valve member. Assuming the vent 93 is piped or otherwise connected to some other location, any excess liquid pressure or sewer gases will be transmitted through the vent 93 and by way of this piping. Assuming that the vent has been closed by a pipe plug because of the inability or undesirability of connecting the same otherwise, it will be seen that a column of air is also trapped in the bore of the lower body member which will keep solids and liquids from reaching the valve seat 71.

The material of construction of the valve member is preferably a rigid polyvinyl chloride material so that sufficient rigidity is given to this member and the outer surface of the closed upper end 90 is preferably coated with a neoprene type rubber which is sufficiently flexible to provide for good sealing on the valve seat but which will readily release when the valve member should move to its open position. A shoulder 91 is provided in the interior of the closed upper end 90 and is for the purpose of engaging the top of the valve guide 84 to limit the downward movement of the valve member when it moves to open position.

It will therefore be appreciated by those skilled in the art that the present drain check valve and particularly the check valve shown and described in FIGS. 4 through 7 is extremely well designed to conveniently fit into, be installed in and be removed from presently existing sewer drain pipe which conventionally exists in present homes and other installations. The assembly is adapted for convenient installation and once installed the check valve can be removed from the drain pipe for cleaning or for whatever reason might be desired. Many of the prior art devices which have been designed are so extremely complicated as to be virtually impossible to install, and then once installed, result in a permanent installation which cannot be removed without tearing up a substantial part of the floor within which the device is installed. The use of the fitting ring 52 provides a means of installing the check valve of the present invention in conventional drain pipe and provides that consistent holding power is utilized in securing the assembly in position within the necessity of utilizing a skilled workman for the installation. The particular and specific design of the valve member and the valve guide upon which it travels provides a construction which is kept free of the liquid and solids which may travel through the valve assembly and this results in longevity and good working of the entire assembly. When the vent 93 is maintained in a closed position the liquids and solids which the check valve is adapted to prevent from passing back through the entrance of the device are also kept off of the sealing surfaces of the valve member and the valve seat. Other advantages will be apparent to those skilled in the art after reviewing the present disclosure.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A drain check valve in a drain combination including a sewer drain pipe having an upper open bell portion connected to a lower smaller diameter conduit portion by a shoulder defining a surface, a fitting ring having one end portion resting on said surface and having another end portion terminating approximately level with said upper open bell portion, said fitting ring having an outer surface having a recessed wall portion and defining an annular chamber with said upper open bell portion, said fitting ring having an inner surface having a wall thereon defining a shoulder, cement in said annular chamber and in said recessed wall portion of said fitting ring to hold said fitting ring fixedly in position, said check valve comprising a lower body member having upper and lower end portions and having a bore extending therethrough, said upper end portion of said lower body member having a stop surface and a force applying surface thereon, an upper body member having upper and lower end portions and having a bore extending therethrough generally coaxially with said bore in said lower body member, wall means in said upper body member bore defining a valve seat, said lower end portion of said upper body member having a stop surface and a force applying surface thereon axially in line respectively with said stop surface and said force applying surface on said lower body member, a deformable ring surrounding said lower end portion of said upper body member and located between said force applying surfaces on said upper and lower body members respectively, a plurality of generally axially extending bolts extending between said upper and lower body members and in tightened condition axially pulling said body members together and axially compressing said ring between said two force applying surfaces causing it to radially expand into contact with said inner surface of said fitting ring below said shoulder thereon, said two stop surfaces limiting axial movement of said body members and radial expansion of said ring, an axially extending valve guide secured to said lower end portion of said lower body member, a valve member movable on said valve guide between an upper closed position in engagement with said valve seat and a lower open position, said valve member comprising a generally cylindrically shaped member having an open lower end and a closed upper end, said closed upper end including a hemispherically shaped wall which engages said valve seat in said closed position of said valve member, and a vent opening in said upper body for providing communication from said bore of said lower body member to atmosphere.

2. A drain check valve in a drain combination including a sewer drain pipe having an upper open bell portion connected to a lower smaller diameter conduit portion by a shoulder defining a surface, a fitting ring having one end portion resting on said surface and having another end portion terminating approximately level with said upper open bell portion, said fitting ring having an outer surface defining an annular chamber with said upper open bell portion, said fitting ring having an inner surface, cement in said annular chamber to hold said fitting ring fixedly in position, said check valve comprising a lower body member having a bore extending therethrough, said lower body member having a stop surface and a force applying surface thereon, an upper body member having a bore extending therethrough generally coaxial with said bore in said lower body member, wall means in said upper body member bore defining a valve seat, said upper body member having a stop surface and a force applying surface thereon axially in line respectively with said stop surface and said force applying surface on said lower body member, a deformable ring surrounding one of said upper and lower body members and located between said force applying surfaces on said upper and lower body members respectively, a plurality of bolts extending between said upper and lower body members and in tightened condition axially pulling said body members together and axially compressing said ring between said two force applying surfaces causing it to radially expand into contact with said inner surface of said fitting ring, said two stop surfaces limiting axial mvoement of said body members and radial expansion of said ring, a valve guide secured to said lower body member, a valve member movable on said valve guide between an upper closed position in engagement with said valve seat and a lower open position, said valve member comprising a generally cylindrically shaped member havig an open lower end and a closed upper end, said closed upper end including a hemispherically shaped wall which engages said valve seat in said closed position of said valve member.

3. A drain check valve comprising a lower body member having upper and lower end portions and having a bore extending therethrough, said upper end portion of said lower body member having a stop surface and a force applying surface thereon, an upper body member having upper and lower end portions and having a bore extending therethrough generally coaxial with said bore in said lower body member, one of said upper end portion of said lower body member and said lower end portion of said upper body member comprising an unthreaded counterbore and the other comprising an unthreaded extension fitting within said unthreaded counterbore, wall means in said upper body member bore defining a valve seat, said lower end portion of said upper body member having a stop surface and a force applying surface thereon axially in line respectively with said stop surface and said force applying surface on said lower body member, a deformable ring surrounding said lower end portion of said upper body member and located between said force applying surfaces on said upper and lower body members respectively, a plurality of generally axially extending bolts extending between said upper and lower body members and in tightened condition axially pulling said body members together and axially compressing said ring between said two force applying surfaces causing it to radially expand, said two stop surfaces, limiting axial movement of said body members and radial expansion of said ring, an axially extending valve guide secured to said lower end portion of said lower body member, a valve member movable on said valve guide between an upper closed position in engagement with said valve seat and a lower open position, said valve member comprising a generally cylindrically shaped member having an open lower end and a closed upper end, said closed upper end including a hemispherically shaped wall which engages said valve seat in said closed position of said valve member, and a vent opening in said upper body member for providing communication from said bore of said lower body member to atmosphere.

4. A drain check valve comprising a lower body member having a bore extending therethrough, said lower body member having a stop surface and a force applying surface thereon, an upper body member having a bore extending therethrough generally coaxial with said bore in said lower body member, one of said lower body member and said upper body member comprising an unthreaded counterbore and the other comprising an unthreaded extension fitting within said unthreaded counterbore, wall means in said upper body member bore defining a valve seat, said upper body member having a stop surface and a force applying surface thereon axially in line respectively with said stop surface and said force applying surface on said lower body member, a deformable ring surrounding one of said upper and lower body members and located between said force applying surfaces on said upper and lower body members respectively, a plurality of bolts extending between said upper and lower body members and in tightened condition axially pulling said body members together and axially compressing said ring between said two force applying surfaces causing it to radially expand, said two stop surfaces limiting axial movement of said body members and radial expansion of said ring, a valve guide secured to said lower body member, a valve member movable on said valve guide between an upper closed position in engagement with said valve seat and a lower open position, said valve member comprising a generally cylindrically shaped member having an open lower end and a closed upper end, said closed upper end including a hemispherically shaped wall which engages said valve seat in said closed position of said vlave 5. A drain check valve comprising a body having a bore therein, a valve seat in said bore, a valve mounting member in said bore, said valve mounting member having at least three spaced and axially extending bearing surfaces, a valve member adapted to close against said valve seat, said valve member comprising a cylindrically shaped hollow member having an open lower end to fit over said valve mounting member whereby said valve member is guided between open and closed positions on said bearing surfaces on said valve mounting member, said cylindrically shaped hollow member having a closed airtight upper end which has an outer convex surface adapted to engage said valve seat in said closed position of said valve member, mounting means for securing the body against a surrounding structure including a deformable gasket, means for compressing said gasket longitudinally with respect to said bore to cause deformation thereof radially with respect to said bore, and stop means to limit the compression of said gasket to a predetermined value.

6. A drain check valve as claimed in claim 5, wherein said means for compressing said gasket comprises said body having two separate parts with opposed facing surfaces on either side of said deformable gasket, and means acting between said two separate parts to move the same toward each other.

7. A drain check valve in a drain combination including a sewer drain pipe having an upper open bell portion connected to a lower smaller diameter conduit portion by a shoulder defining a surface, a fitting ring having one end portion resting on said surface and having another end portion terminating approximately level with said upper open bell portion, said fitting ring having an outer surface defining an annular chamber with said upper open bell portion, said fitting ring having an inner surface, means in said annular chamber to hold said fitting ring fixedly in position, said check valve comprising a lower body member having a bore extending therethrough, said lower body member having a stop surface and a force applying surface thereon, an upper body member having a bore extending therethrough generally coaxial with said bore in said lower body member, wall means in said upper body member bore defining a valve seat, said upper body member having a stop surface and a force applying surface thereon axially in line respectively with said stop surface and said force applying surface on said lower body member, a deformable ring surrounding one of said upper and lower body members and located between said force applying surfaces on said upper and lower body members respectively, a plurality of bolts extending between said upper and lower body members and in tightened condition axially pulling said body members together and axially compressing said ring between said two force applying surfaces causing it to radially expand into contact with said inner surface of said fitting ring, said two stop surfaces limiting axial movement of said body members and radial expansion of said ring, a valve guide secured to said lower body member, a valve member movable on said valve guide between an upper closed position in engagement with said valve seat and a lower open position, said valve member comprising a generally cylindrically shaped member having an open lower end and a closed upper end, said closed upper end including a hemispherically shaped wall which engages said valve seat in said closed position of said valve member.

* * * * *